(12) United States Patent
Miramontes (10) Patent No.: US 7,116,229 B1
(45) Date of Patent: Oct. 3, 2006

(54) PROGRAMMING A REMOTE CONTROL DEVICE USING RFID TECHNOLOGY

(75) Inventor: Oscar Miramontes, El Paso, TX (US)

(73) Assignee: ZiLOG, Inc., San Jose, CA (US)

( * ) Notice: Subject to any disclaimer, the term of this patent is extended or adjusted under 35 U.S.C. 154(b) by 124 days.

(21) Appl. No.: 10/814,708

(22) Filed: Mar. 31, 2004

(51) Int. Cl.
G08B 13/14 (2006.01)

(52) U.S. Cl. .............. 340/572.1; 340/572.18; 340/10.51; 340/14.3; 340/539.1; 340/572.4; 340/825.22; 341/176

(58) Field of Classification Search ............ 340/572.1, 340/572.2, 572.7, 572.8, 10.1, 10.5, 10.52, 340/10.51, 539.1, 825.22, 825.72, 572.4, 340/14.3, 825.69; 341/176; 235/462.45, 235/462.46
See application file for complete search history.

(56) References Cited

U.S. PATENT DOCUMENTS

| | | | |
|---|---|---|---|
| 6,020,881 A * | 2/2000 | Naughton et al. | 715/740 |
| 6,167,464 A * | 12/2000 | Kretschmann | 710/15 |
| 6,225,938 B1 * | 5/2001 | Hayes et al. | 341/176 |
| 6,392,544 B1 * | 5/2002 | Collins et al. | 340/572.7 |
| 6,531,964 B1 | 3/2003 | Loving | 340/825.72 |
| 7,005,979 B1 * | 2/2006 | Haughawout et al. | 340/539.1 |
| 7,046,161 B1 * | 5/2006 | Hayes | 340/825.69 |
| 2004/0070491 A1 * | 4/2004 | Huang et al. | 340/10.5 |

OTHER PUBLICATIONS

Product specification entitled "HITAG 1 stick transponder HT1DC20S30," by Philips Semiconductors, dated Sep. 24, 2001, 7 pages.
Data sheet entitled "HTCM400 HITAG core module hardware," by Philips Semiconductors, dated Oct. 4, 2001, 24 pages.
Eero Kytö, "Radio Frequency Identification Tags," 10 pages downloaded from Internet on Mar. 30, 2004 from http://mit.tut.fi/7504020/Materiaalit/Microsensors2002/.
C. Aquino, J. Linderman and T. Turman, "Bravo TV (Base, remote, Active Viewer Output)," 3 pages downloaded from Internet on Mar. 30, 2004 from http://coweb.cc.gatech.edu:8080/lcc6113b/40.

* cited by examiner

Primary Examiner—Davetta W. Goins
(74) Attorney, Agent, or Firm—Silicon Edge Law Group LLP; Darien K. Wallace; T. Lester Wallace (57) ABSTRACT

A system for programming a remote control device incorporates a battery-powered radio frequency identification (RFID) reader into the remote control device. A passive RFID transponder is embedded into the electronic consumer device, or is otherwise provided to the consumer. The RFID transponder stores codeset data usable to control the electronic consumer device. In one example, the codeset data is an entire codeset. In another example, the codeset data is a designation of a codeset. The remote control device is placed in proximity to the RFID transponder, and a program key is pressed on the remote thereby causing the RFID reader in the remote control device to read the codeset data out of the RFID transponder and into the remote control device. In one embodiment, the codeset data is read from the RFID transponder using absorption modulation. The codeset data enables the remote control device to control the electronic consumer device.

11 Claims, 5 Drawing Sheets

FIG. 1

PROGRAMMING A REMOTE CONTROL
DEVICE USING AN RFID COMMUNICATION

PROGRAMMING A REMOTE CONTROL DEVICE USING RFID TECHNOLOGY

TECHNICAL FIELD

The present invention relates generally to remote control devices and, more specifically, to programming remote control devices with codeset data.

BACKGROUND

Most households today possess multiple types of electronic consumer devices, such as televisions, stereo radios, digital video disk players, video cassette recorders, set-top cable television boxes and set-top satellite boxes. Manufacturers of such electronic consumer devices typically supply a remote control device along with each electronic consumer device. It is, therefore, common for a consumer who has multiple electronic consumer devices to have multiple remote control devices.

A remote control device typically controls a selected electronic consumer device by transmitting infrared operational signals to the selected electronic consumer device. The operational signals contain key codes of a codeset associated with the selected electronic consumer device. Each key code corresponds to a function of the selected electronic consumer device, such as power on, power off, volume up, volume down, mute, play, stop, select, channel up, channel down, etc. In order to avoid the situation where a remote control device operates an electronic consumer device other than the intended one, manufacturers sometimes use distinct codesets for the communication between various electronic consumer devices and their associated remote control devices. The codesets can differ from each other not only by the bit patterns assigned to various functions of the associated electronic consumer device, but also by the timing information that describes how the key codes are modulated onto carrier signals to generate operational signals.

Consumers may find it inconvenient to operate their electronic consumer devices using multiple remote control devices. Thus, a consumer may wish to operate multiple electronic consumer devices using a single remote control device. A single remote control device can store many codesets so that the remote control device can control a corresponding large number of different electronic consumer devices. There are, however, thousands of codesets in use in electronic consumer devices today. A consumer might find it tedious and confusing to program a single remote control device with all of the appropriate codesets for the electronic consumer devices in his household.

A method is sought for easily programming a remote control device to operate various selected electronic consumer devices.

SUMMARY

A system facilitates easy programming of a remote control device so that the remote control is usable to control an electronic consumer device. The system includes a radio frequency identification (RFID) reader (for example, that is built into the remote control device) and a passive RFID transponder (for example, that is built into or affixed to the electronic consumer device).

In one embodiment, multiple codesets are stored in a memory of the remote control device. The multiple codesets include one particular codeset that is usable to control the electronic consumer device. The codeset includes codeset key data for various functions of the electronic consumer device. A designation of this codeset is stored in the RFID transponder, along with a one-digit device number. The designation may, for example, be a three-digit number.

The RFID reader in the remote control device interrogates the RFID transponder in the electronic consumer device. To do this, the remote control device is brought into close proximity to the RFID transponder in the electronic consumer device and a program key on the remote control pressed, thereby causing the RFID reader within the remote control device to transmit an interrogation signal to the RFID transponder. The interrogation signal imparts energy to the RFID transponder. The RFID transponder is not powered by a power source, but rather is powered by energy in the interrogation signal. In one example, the energy is conveyed by inductive coupling of an alternating magnetic field generated by the RFID reader.

The RFID transponder uses the energy conveyed by the RFID reader to power circuitry that generates a programming signal. The programming signal includes the designation of the particular codeset, along with the one-digit device number. The RFID reader in the remote control device receives the programming signal, extracts the designation of the codeset, and uses the designation to select the corresponding one of the codesets stored in the memory on the remote control device that is usable to control the electronic consumer device. When a key on the remote control device is later pressed, the remote control device uses key data of the selected codeset to generate an operational signal. The remote control device transmits the operational signal to the electronic consumer device, thereby controlling the corresponding function of the electronic consumer device. In this way, a designation of the codeset, along with a one-digit device number, is read from an RFID transponder into a remote control device so that the remote control device then uses the correct codeset to control the electronic consumer device.

In another example, the particular codeset that is usable to control the electronic consumer device is not initially stored on the remote control device. Instead, the particular codeset is stored in the RFID transponder. Again, the RFID reader interrogates the RFID transponder and the RFID transponder uses energy conveyed by the RFID reader to power circuitry that generates a programming signal. Codeset data of the particular codeset associated with the electronic consumer device are modulated onto the programming signal by the circuitry in the RFID transponder. The codeset data include codeset key data that correspond to a function of the electronic consumer device.

The RFID reader in the remote control device receives the programming signal, extracts the codeset key data, and uses the codeset key data to generate an operational signal. The remote control device transmits the operational signal to the electronic consumer device, thereby controlling the function of the electronic consumer device that corresponds to the key data.

In one embodiment, a complete codeset including key data for each of many keys on the remote control device is received from the RFID transponder onto the remote control device. This codeset is stored into memory on the remote control device. When a key (for example, the power key) on the remote control device is later pressed, a key code (of the stored codeset) associated with the key pressed is retrieved from memory and is used by the remote control device to generate an operational signal. The operational signal is, for example, an infrared signal. The operational signal is transmitted from the remote control device and to the electronic consumer device to be controlled. In the case where the key pressed was the power key, the operational signal causes the electronic consumer device to power on or power off.

A method is disclosed for activating a codeset on a remote control device using RFID technology. An RFID reader in a remote control device receives a programming signal containing codeset data associated with an electronic consumer device. The codeset data include codeset key data that correspond to a function of the electronic consumer device. The remote control device controls the function of the electronic consumer device by transmitting an operational signal that contains the codeset key data.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
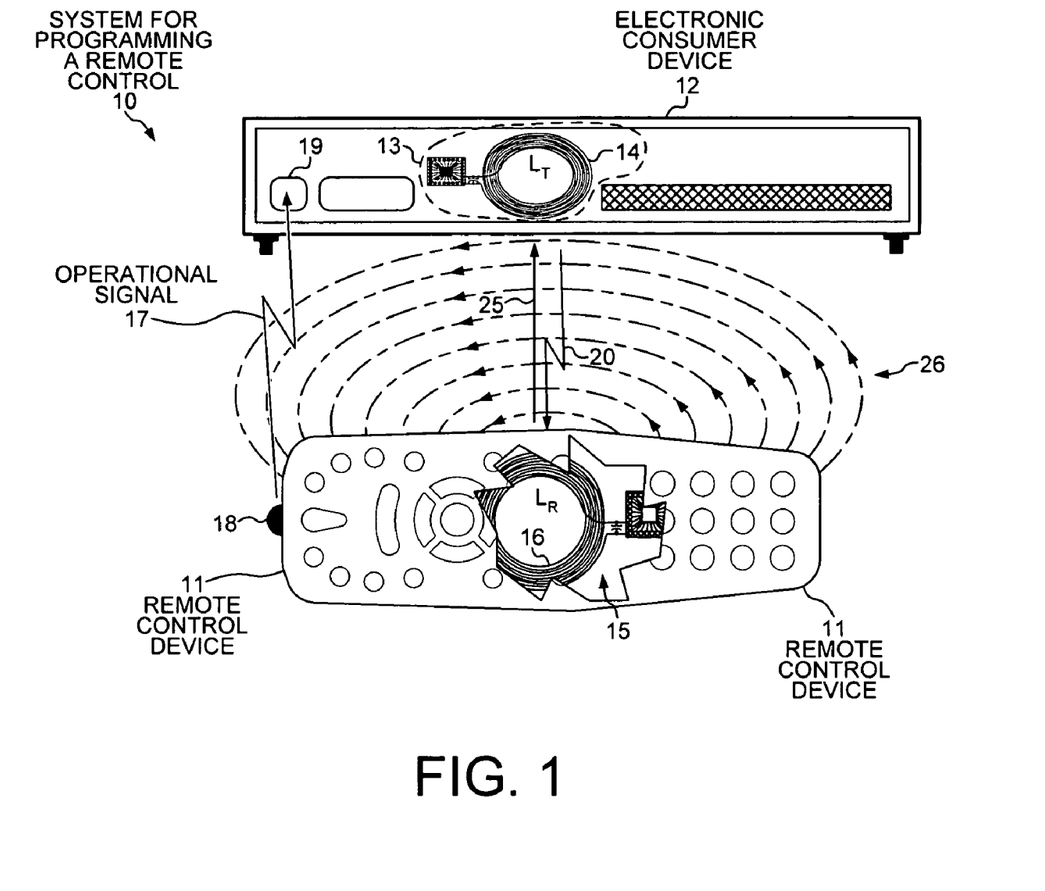
FIG. 1 is a schematic diagram of a system for programming a remote control device using radio frequency identification (RFID) technology.

FIG. 1 shows a system 10 that uses a radio frequency identification (RFID) technology to program a remote control device 11 to control an electronic consumer device 12. Electronic consumer device 12 includes an RFID transponder 13. RFID transponder 13 may, for example, be embedded into, or attached to, the housing of electronic consumer device 12.

RFID transponder 13 has a coupling element 14, which is an inductor $L_T$. In this example, electronic consumer device 12 is a digital video disc (DVD) player. In addition to controlling DVD player 12, remote control device 11 also controls the operation of various other electronic consumer devices. The other electronic consumer devices controlled by remote control device 11 include, for example, a television set, a video cassette recorder, a stereo equalizer, a radio tuner, a set-top box for receiving programming via a satellite, and a set-top box for receiving programming via a cable.

Remote control device 11 includes an RFID reader 15 that includes a coupling element 16. Remote control device 11 controls DVD player 12 by transmitting operational signals containing codeset data from a first codeset. The codeset data are associated with DVD player 12. An operational signal 17 contains codeset key data corresponding to a function of DVD player 12, such as "play." Other functions that remote control device 11 controls include, for example, power on, volume up, volume down, mute, channel advance, channel back, cursor up, cursor down, cursor right, cursor left, menu, select, record, stop, forward, back and pause. Remote control device 11 includes an IR transmitter 18. Operational signal 17 is transmitted in an infrared (IR) channel from IR transmitter 18 to an IR receiver 19 on DVD player 12. In other embodiments, remote control device 11 has a radio frequency (RF) transmitter that transmits operational signal 17 over an RF channel to an RF receiver on electronic consumer device 12. For additional details on transmitting an operational signal containing codeset information over an RF channel, see U.S. patent application Ser. No. 10/737,029 entitled "Relaying Key Code Signals Through a Remote Control Device," filed on Dec. 16, 2003, which is incorporated herein by reference.

Before remote control device 11 transmits operational signal 17, however, remote control device 11 is programmed to generate codeset key data corresponding to the first codeset, which controls DVD player 12. In a first example, remote control device 11 includes a memory. Codeset data for multiple codesets, including the first codeset, are stored in the memory. The codeset data for each codeset include codeset information, as well as tables of modulation, timing and framing protocols. Codeset information includes a protocol number of each particular codeset, key flags, codeset key data, a system code, and format and size information relating to the system code and key data. The protocol number for the first codeset, which controls DVD player 12, is a pointer that points to the protocol table that contains the modulation, timing and framing protocol used to modulate the key data and the system code onto operational signal 17. The digital values of the system code and the key data are modulated onto operational signal 17 using a modulation technique (for example, pulse width modulation) determined by the protocol table that is pointed to. For additional details on the structure of codeset data, see U.S. patent application Ser. No. 10/777,023 entitled "Interactive Web-Based Codeset Selection and Development Tool," filed on Feb. 10, 2004, which is incorporated herein by reference.

In the first example where codeset data for multiple codesets (including the first codeset) are stored in remote control device 11, remote control device 11 is programmed to control DVD player 12 when remote control device 11 receives a programming signal 20 containing a designation of the first codeset, along with a one-digit device number. In this example, the designation of the first codeset is a three-digit decimal number.

Figure 2:
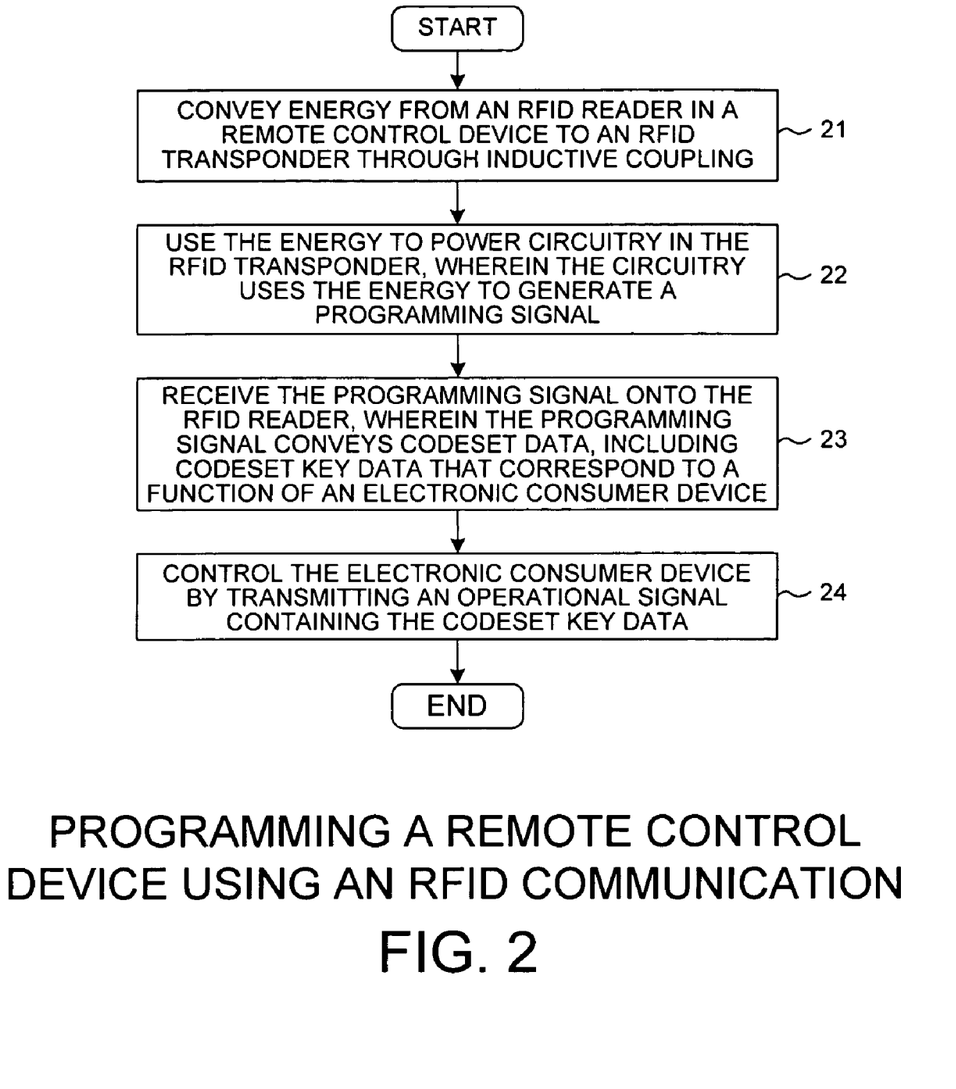
FIG. 2 is a flowchart of steps for programming a remote control device using RFID technology.

FIG. 2 is a flowchart illustrating steps 21–24 of a method by which system 10 programs a remote control device using radio frequency identification (RFID) technology. The steps of FIG. 2 will now be described in relation to the programming remote of remote control device 11 to transmit operational signal 17 containing codeset key data that controls a function of DVD player 12, as shown in FIG. 1.

Initially, a consumer places remote control device 11 in close proximity (for example, six centimeters) to the RFID reader 13 within electronic consumer device 12 and presses a program key on remote control device 11. Pressing the program key causes a frequency generator within remote control device 11 to generate an oscillating current in coupling element 16. The oscillating current may, for example, oscillate at 125 kHz. The oscillating current in coupling element 16 generates an alternating magnetic field 26. Remote control device 11 (including the frequency generator within it) is battery-powered and the energy of the alternating magnetic field 26 comes from the battery. In this embodiment, coupling element 16 is a coil of lacquered copper wire. The diameter of the coil is thirty-five mm, and the diameter of the copper wire is 0.223 mm. There are 85 turns in the coil. For additional details on the structure of an RFID reader, see the data sheet entitled "HTCM400 HITAG core module hardware," by Philips Semiconductors, dated Oct. 4, 2001, which is incorporated herein by reference.

Because coupling element 14 is within alternating magnetic field 26, an alternating current is induced into coupling element 14. Energy 25 is transferred (step 21) from RFID reader 15 to RFID transponder 13 via inductive coupling. RFID transponder 13 is a passive RFID transponder and is not connected to a battery or other power source. In this example, RFID transponder 13 is a circuit independent of the other circuitry of electronic consumer device 12.

Figure 3:
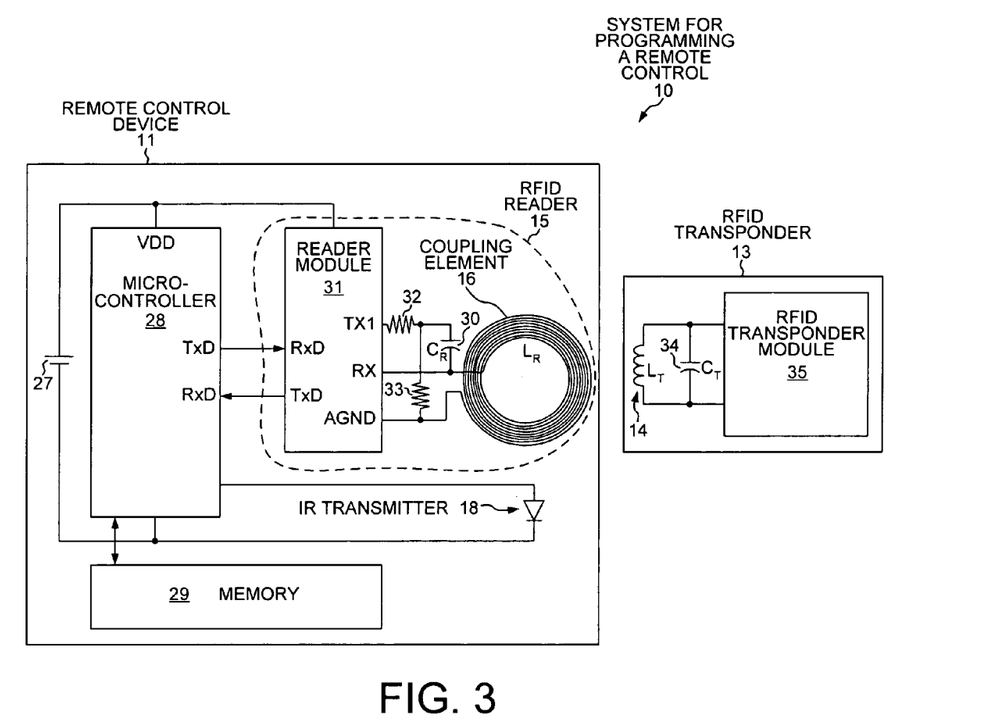
FIG. 3 is a simplified block diagram of an RFID reader embedded in a remote control device, as well as an RFID transponder.

FIG. 3 is a simplified block diagram of remote control device 11 and RFID transponder 13. Remote control device 11 includes RFID reader 15, IR transmitter 18, a battery 27, a microcontroller 28 and a memory 29. IR transmitter 18 is a light-emitting diode. Memory 29 is an EEPROM memory. Battery 27 provides a supply voltage of between two to five volts. In first step 21, energy from battery 27 generates alternating magnetic field 26 and is conveyed from RFID reader 15 to RFID transponder 13 in DVD player 12.

RFID reader 15 includes coupling element 16, a capacitor 30, a reader module 31, a first resistor 32 and a second resistor 33. Capacitor 30 and coupling element 16 together form an LC circuit having a characteristic resonant frequency. For a given inductance $L_R$ of reader coupling element 16, the capacitance $C_R$ of reader capacitor 30 is set such that alternating magnetic field 26 oscillates at 125 kHz±4 kHz. The resistance of first resistor 32 and second resistor 33 can be regulated in order to stabilize the LC circuit when it acts as an antenna.

RFID transponder 13 includes transponder coupling element 14, a capacitor 34 and an RFID transponder module 35. Capacitor 34 and transponder coupling element 14 together form an LC circuit having a characteristic resonant frequency. For a given inductance $L_T$ of transponder coupling element 14, the capacitance $C_T$ of transponder capacitor 34 is set such that the LC circuit of RFID transponder 13 is tuned to about 125 kHz.

Figure 4:
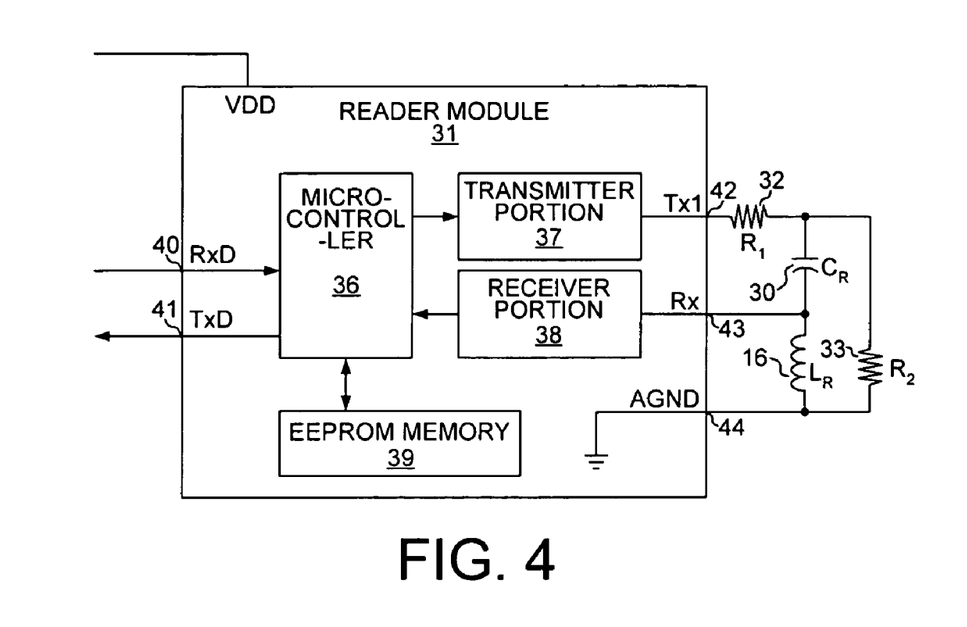
FIG. 4 is a simplified block diagram of the RFID reader module of FIG. 3.

FIG. 4 shows reader module 31 in more detail. Reader module 31 includes a microcontroller 36, a transmitter portion 37, a receiver portion 38, EEPROM memory 39, a serial interface input lead RxD 40 from microcontroller 28, a serial interface output lead TxD 41 to microcontroller 28, an antenna output lead Tx1 42, an antenna input lead Rx 43, and an analog ground lead 44. Serial interface input lead RxD 40 and serial interface output lead TxD 41 can operate using RS232, RS422 or RS485 interface protocols.

Figure 5:
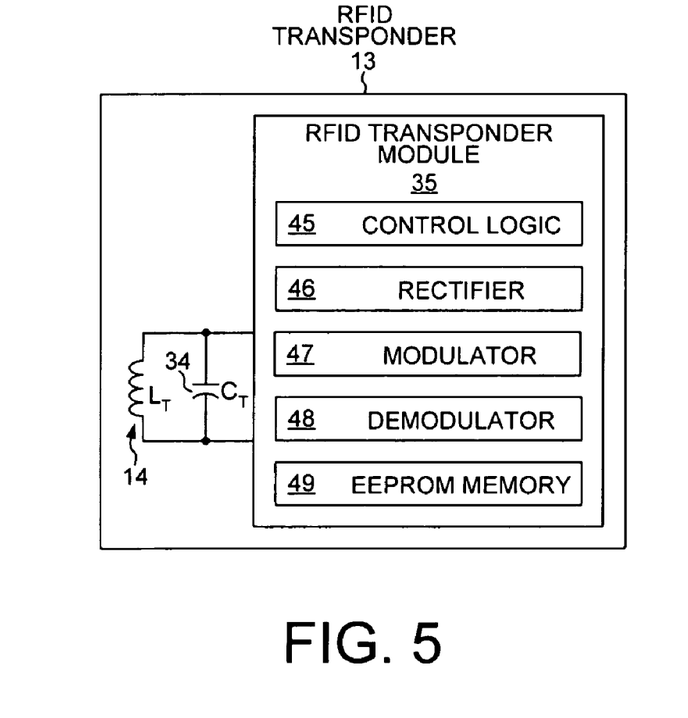
FIG. 5 is a simplified block diagram of the RFID transponder of FIG. 3.

FIG. 5 shows the circuitry of RFID transponder module 35 of RFID transponder 13 in more detail. RFID transponder module 35 includes control logic 45, a rectifier 46, a modulator 47, a demodulator 48 and EEPROM memory 49. EEPROM memory 49 has a 2048-bit capacity. For additional details on the structure of an RFID transponder, see the product specification entitled "HITAG 1 stick transponder HT1DC20S30," by Philips Semiconductors, dated Sep. 24, 2001, which is incorporated herein by reference.

Returning to FIG. 2, in a second step 22, energy 25 conveyed from RFID reader 16 to RFID transponder 13 is used to power the circuitry of RFID transponder 13. Rectifier 46 in RFID transponder module 35 generates a rectified version of the alternating signal in coupling element 14. Control logic 45 then retrieves codeset data stored in EEPROM memory 49. In this first example, the codeset data stored in memory 49 are a three-digit decimal number designating the particular codeset that controls DVD player 12. Modulator 47 modulates the codeset data using amplitude shift keying (ASK) modulation, and circuitry in RFID transponder 13 generates programming signal 20 containing the modulated codeset data.

In addition to capturing energy to power the circuitry of RFID transponder 13, RFID transponder 13 also selectively draws energy from magnetic field 26 by regulating the impedance of its LC circuit. Programming signal 20 is used to control this selective drawing of energy (absorption modulation). RFID reader 15 detects the selective drawing of energy such that programming signal 20 is received (step 23) onto the RFID reader 15 of remote control device 11. RFID reader 15 receives programming signal 20 by detecting a voltage drop on reader coupling element 16 when an amount of alternating magnetic field 26 is absorbed by transponder coupling element 14. In this first example, programming signal 20 includes the designation of the first codeset. The designation of the first codeset is therefore communicated via absorption modulation from RFID transponder 13 to RFID reader 15.

In this first example, codeset data for multiple codesets, including the first codeset, are stored in memory 29 of remote control device 11. Microcontroller 28 activates the particular codeset stored in memory 29 that is indicated by the designation of the first codeset, thereby enabling remote control device 11 to control DVD player 12.

In a step 24, remote control device 11 transmits operational signal 17 to DVD player 12, causing DVD player 12 to perform a function associated with pressing one or more keys on remote control device 11. Step 24 may be initiated by the consumer's pressing of a key on remote control device 11, wherein the pressing of the key causes operational signal 17 to be transmitted from IR transmitter 18. Microcontroller 28 modulates the codeset key data onto operational signal 17 that corresponds to the desired function of DVD player 12, in this example "play."

In a second example of the operation of system 10, codeset data for the first codeset, which controls DVD player 12, are not initially stored in memory 29 of remote control device 11. In this example, the entire first codeset is stored in memory 49 of RFID transponder module 35. In addition, several other entire codesets can also be stored in the 2048-bit/256-byte memory 49 of RFID transponder module 35. The overall memory required to store multiple codesets can be reduced by sharing common modulation protocols, as opposed to storing common protocols with each codeset. The total size of a table of codeset information plus the corresponding table of modulation, timing and framing protocols can be less than one hundred bytes. In this second example, the codeset information table and the protocol table for the first codeset occupy about sixty bytes in memory 49.

In step 22 of the second example, modulator 47 modulates the codeset information table and the protocol table for the first codeset onto programming signal 20.

In step 23 of the second example, RFID reader 15 receives programming signal 20, which in this case includes the entire first codeset. Thus, RFID reader 15 receives codeset key data corresponding to various functions of DVD player 12.

In step 24 of the second example, remote control device 11 transmits operational signal 17 containing codeset key data. The codeset key data correspond to one of the functions for which codeset key data were transmitted in programming signal 20.

Figure 6:
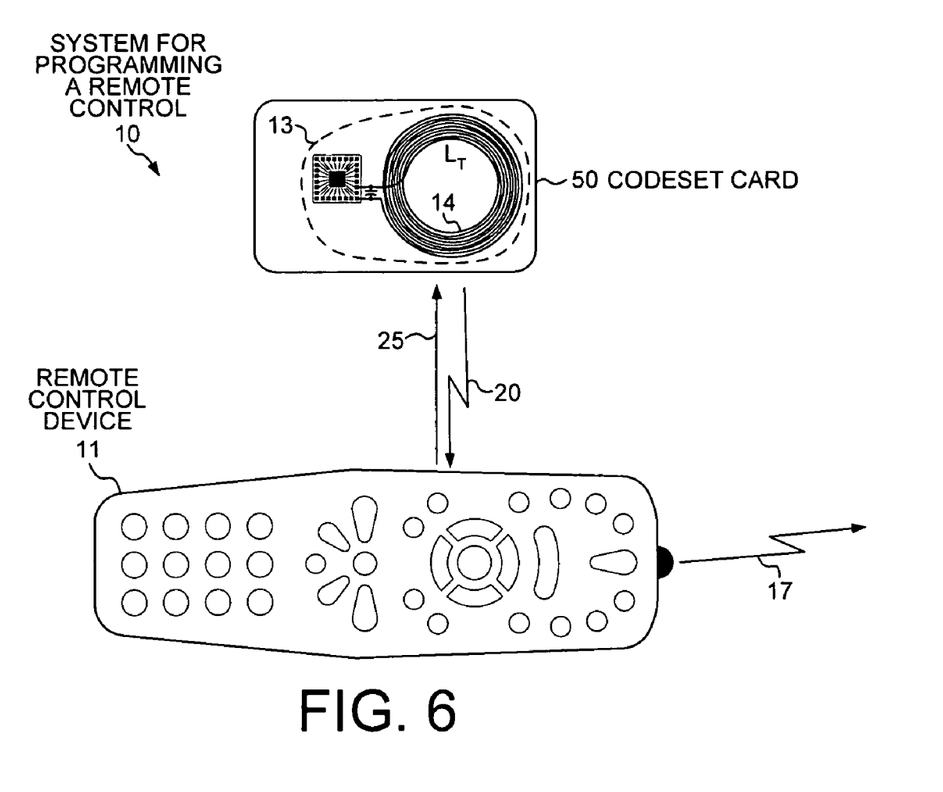
FIG. 6 is a schematic diagram of an embodiment of the system of FIG. 1 including an RFID transponder in a codeset card.

FIG. 6 illustrates a third example of the operation of system 10. In the embodiment shown in FIG. 6, RFID transponder 13 is contained in a codeset card 50. The form of codeset card 50 resembles RFID tags used as building access cards. In this example, up to four 60-byte codesets are stored in the 256-byte memory 49 of RFID transponder module 35 of RFID transponder 13. The codesets are loaded into remote control device 11 by placing codeset card 50 in the vicinity of remote control device 11 and by pressing a programming key on remote control device 11. Pressing the programming key causes the RFID reader within remote control device 11 to interrogate the RFID transponder 13, to energize the circuitry within the RFID transponder 13, and to read back the codesets stored in the codeset card 50. Codeset card 50 can be delivered to the consumer along with electronic consumer device 12. For example, codeset card 50 is inserted into a packing box containing DVD player 12. The cost of incorporating RFID transponder 13 into the hardware of DVD player 12 is thereby avoided. Alternatively, a consumer can obtain codeset card 50 from someone other than the manufacturer of electronic consumer device 12. For example, a consumer who wishes to avoid the hassle of programming remote control device 11 to control the various electronic consumer devices in the consumer's household can program the various devices by purchasing a codeset card for each of the devices. The consumer then easily programs remote control device 11 by placing each of the cards near remote control device 11, and loading the codesets from the cards into the remote control device 11. The consumer may, for example, purchase codeset cards at an appliance store. A consumer might also wish to use system 10 to program remote control device 11 to control an electronic consumer device for which the operating manual has been lost and which therefore cannot be programmed in the originally intended manner.

Although the embodiment of system 10 in the third example includes a 256-byte memory 49 in RFID transponder 13, other embodiments have RFID transponders with more memory. By providing more memory, tens or even hundreds of codesets can be stored in the memory of codeset card 50. In one example, local appliance stores sell codeset cards containing dozens of codesets for the most popular electronic consumer devices used in the geographical area where the codeset cards are sold. All the energy necessary to communicate the codeset data back to the RFID reader may be imparted to the RFID transponder before the codeset data is communicated back. Alternatively, energy can be imparted to the RFID transponder at the same time that the RFID transponder is communicating codeset data back to the RFID reader. Codeset data can be read out of an RFID transponder in a set of interrogations. Although a passive RFID transponder is described above, codeset data is communicated in other embodiments by active (powered) RFID transponders. Such active RFID transponders may be battery-powered, or may be powered by the power source of the electronic consumer device.

Manufacturers of electronic consumer devices may not wish to include RFID transponders in their devices or even codeset cards along with their devices. In this situation, system 10 can nevertheless be used to program remote control devices. For example, a television manufacturer may choose not to incorporate an RFID transponder containing a codeset designation or a complete codeset into it televisions. The television manufacturer may, however, embed an RFID transponder into a television or its packaging for its own purposes, such as to track the television during manufacturing or to assist in inventory control. The RFID transponder would contain a serial number uniquely identifying the television within the universe of televisions made by the particular manufacturer. The serial number might not be unique with respect to all televisions on the market.

In accordance with one embodiment, remote control device 11 includes cross-reference information that associates serial numbers with codeset numbers. RFID reader 15 in remote control device 11 interrogates the manufacturer's RFID transponder in the television and reads back the serial number. Microcontroller 28 of remote control device 11 then uses the serial number to index a cross-reference table in memory 29 to lookup the particular codeset associated with the serial number. Information other than serial numbers may also be used as inputs to the cross-reference table. The consumer may, for example, enter certain easy-to-enter information such as the brand of the television, and this information in combination with the serial number is used to determine the associated codeset.

Although the present invention has been described in connection with certain specific embodiments for instructional purposes, the present invention is not limited thereto. Although energy is transferred from RFID reader 15 to RFID transponder 13 via inductive coupling, and programming signal 20 is transmitted using absorption modulation, system 10 can transfer energy and information using other mechanisms. For example, system 10 can employ backscatter coupling in which a small portion of an RF signal from RFID reader 15 is reflected by RFID transponder 13 back to RFID reader 15. The reflected signal is modulated and encoded with codeset information.

Although energy is transferred from RFID reader 15 to RFID transponder 13 in the embodiments of system 10 described above, the RFID transponder can be powered by a magnetic field leaking out of the power cord of electronic consumer device 12. In this way, the RFID transponder is charged using energy from the 60 Hz wall current, as opposed to energy from battery 27. The RFID transponder is attached to the power cord or to electronic consumer device 12 somewhere near the power cord. When electronic consumer device 12 is turned on, the RFID transponder constantly absorbs energy from the alternating magnetic field that is associated with the alternating electric field of the 60 Hz wall current. The RFID transponder then uses the energy to power circuitry that generates a programming signal containing a designation of a codeset or a complete codeset. Control logic in RFID transponder can be programmed to transmit bursts of the programming signal at regular intervals, for example, every five seconds, while RFID transponder is constantly absorbing energy.

Although system 10 is described above as employing amplitude shift keying (ASK), other types of modulation and data encoding can be used, such as frequency shift keying (PSK), phase shift keying (PSK), Manchester coding and biphase coding. Although the coupling elements of system 10 are described as being wire coils, system 10 can also employ other types of coupling elements. For example, system 10 can implement backscatter coupling using a linear antenna. Furthermore, coupling elements that are coils need be neither round nor wire. For example, rectangular-shaped traces on a flexible film can form a coupling element. Energy can be transmitted to an RFID transponder on one frequency, and information can be transmitted back to the RFID reader on another frequency. Any RFID technology can be used to read back codeset data. The interrogation of the RFID transponder can be automatic and need not be initiated by the pressing of a key on the remote control device. RFID reader circuitry can be integrated onto a general purpose microcontroller integrated circuit such that the remote control device does not include an RFID reader module that is separate from the microcontroller integrated circuit that performs key scanning and that drives the IR transmitter LED. Accordingly, various modifications, adaptations, and combinations of various features of the described embodiments can be practiced without departing from the scope of the invention as set forth in the claims.

What is claimed is:

1. A method comprising:
   (a) receiving a programming signal onto an RFID reader in a remote control device, wherein the programming signal conveys a complete codeset, wherein the programming signal is conveyed to the RFID reader by an RFID transponder that is part of a codeset card.

2. A method comprising:
   (a) receiving a programming signal onto an RFID reader in a remote control device, wherein the programming signal conveys a complete codeset, wherein the complete codeset comprises a table of codeset information and a table of modulation, timing and framing protocols.

3. The method of claim 2, wherein the complete codeset includes codeset key data that correspond to a function of an electronic consumer device.

4. A method comprising:
   (a) receiving a programming signal onto an RFID reader in a remote control device, wherein the programming signal conveys a complete codeset, wherein the complete codeset comprises a digital key code number and timing information, and wherein the timing information describes a digital one and a digital zero.

5. A device comprising:
   an RFID reader module;
   a coupling element; and
   a transmitter, wherein the RFID reader module receives a programming signal from the coupling element, wherein the programming signal conveys a complete codeset, wherein the complete codeset includes codeset key data, wherein the transmitter transmits an operational signal containing the codeset key data, and wherein the complete codeset comprises a table of codeset information and a table of modulation, timing and framing protocols.

6. The device of claim 5, wherein the table of codeset information and the table of modulation, timing and framing protocols have a total size, and wherein the total size is less than one hundred bytes.

7. A method comprising:
   (a) receiving a programming signal onto an RFID reader in a remote control device, wherein the programming signal conveys a complete codeset, wherein the programming signal is conveyed to the RFID reader by an RFID transponder that is part of an electronic consumer device, wherein the electronic consumer device has a power cord, and wherein the RFID transponder is powered by a magnetic field leaking out of the power cord of the electronic consumer device.

8. The method of claim 1, wherein multiple codesets are stored on the codeset card.

9. The method of claim 2, wherein the programming signal conveys a complete second codeset, wherein the table of modulation, timing and framing protocols includes a modulation protocol, and wherein the complete codeset and the complete second codeset share the modulation protocol.

10. The method of claim 2, wherein the table of codeset information and the table of modulation, timing and framing protocols have a total size, and wherein the total size is less than one hundred bytes.

11. The device of claim 5, wherein the programming signal conveys a complete second codeset, wherein the table of modulation, timing and framing protocols includes a modulation protocol, and wherein the complete codeset and the complete second codeset share the modulation protocol.

* * * * *